(12) United States Patent
Sanford et al.

(10) Patent No.: US 12,205,438 B2
(45) Date of Patent: *Jan. 21, 2025

(54) SYSTEMS AND METHODS FOR CREDITING WAGERING ACTIVITY

(71) Applicant: Sightline Payments LLC, Las Vegas, NV (US)

(72) Inventors: Kirk E. Sanford, Las Vegas, NV (US); Thomas M. Sears, Henderson, NV (US); Omer Sattar, Las Vegas, NV (US)

(73) Assignee: Sightline Payments LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/229,828

(22) Filed: Aug. 3, 2023

(65) Prior Publication Data

US 2023/0410596 A1 Dec. 21, 2023

Related U.S. Application Data

(63) Continuation of application No. 17/562,971, filed on Dec. 27, 2021, now Pat. No. 11,735,001, which is a
(Continued)

(51) Int. Cl.
*G07F 17/32* (2006.01)
*G06Q 20/18* (2012.01)
(Continued)

(52) U.S. Cl.
CPC ........ *G07F 17/3244* (2013.01); *G06Q 20/18* (2013.01); *G07F 17/3234* (2013.01);
(Continued)

(58) Field of Classification Search
CPC .. G06Q 20/108; G06Q 40/12; G06Q 20/3676; G06Q 20/10; G06Q 20/18;
(Continued)

(56) References Cited

U.S. PATENT DOCUMENTS

2005/0227760 A1* 10/2005 Vlazny ............... G07F 17/3223
463/28
2007/0187485 A1* 8/2007 Aas ........................ G07D 11/24
235/379
(Continued)

*Primary Examiner* — Justin L Myhr
(74) *Attorney, Agent, or Firm* — Frost Brown Todd LLP

(57) ABSTRACT

Systems and methods are disclosed for provisionally crediting a financial account of a gaming environment based on player funds received by gaming devices in the form of wagers. The financial account can be maintained at a financial institution. The player funds can be currency, electronic funds, or combinations therefor. Once the currency is physically transferred to the financial institution, the provisional credit can be converted to a full credit. Similarly, for wagers using electronic funds, once the settled funds are received by the financial institution, the provisional credit can be converted to a full credit. Using provisional credits, benefits from the funds can be enjoyed by the gaming operator prior to the physical currency and/or settled funds being received and processed by the financial institution.

20 Claims, 9 Drawing Sheets

Related U.S. Application Data continuation of application No. 16/665,020, filed on Oct. 28, 2019, now Pat. No. 11,210,897, which is a continuation of application No. 15/833,655, filed on Dec. 6, 2017, now Pat. No. 10,460,562, which is a continuation of application No. 15/627,516, filed on Jun. 20, 2017, now Pat. No. 9,865,130, which is a continuation of application No. 14/813,718, filed on Jul. 30, 2015, now Pat. No. 9,715,785.

(60) Provisional application No. 62/141,823, filed on Apr. 1, 2015.

(51) Int. Cl.
*G07F 17/34* (2006.01)
*G06Q 40/02* (2023.01)
*G07F 19/00* (2006.01)

(52) U.S. Cl.
CPC .......... *G07F 17/3293* (2013.01); *G07F 17/34* (2013.01); *G06Q 40/02* (2013.01); *G07F 17/3241* (2013.01); *G07F 19/00* (2013.01)

(58) Field of Classification Search
CPC .. G06Q 40/02; G07D 11/0075; G07D 11/009; G07F 7/04; G07F 9/06; G07F 17/3244; G07F 17/3251; G07F 17/3248
See application file for complete search history.

(56) References Cited

U.S. PATENT DOCUMENTS

| | | | |
|---|---|---|---|
| 2008/0113776 A1* | 5/2008 | Sommer | G07F 17/32 463/25 |
| 2010/0010904 A1* | 1/2010 | Sanders | G06Q 20/1085 705/30 |
| 2011/0263318 A1* | 10/2011 | Agarwal | G07F 17/3225 463/25 |
| 2013/0244769 A1* | 9/2013 | Hafezi | G07F 17/3262 463/26 |

* cited by examiner

SYSTEMS AND METHODS FOR CREDITING WAGERING ACTIVITY

CROSS-REFERENCE TO RELATED APPLICATIONS

This application is a continuation of U.S. patent application Ser. No. 17/562,971, filed Dec. 27, 2021, entitled SYSTEMS AND METHODS FOR CREDITING WAGERING ACTIVITY, issued as U.S. Pat. No. 11,735,001 on Aug. 22, 2023, which is a continuation of U.S. patent application Ser. No. 16/665,020, filed Oct. 28, 2019, entitled SYSTEMS AND METHODS FOR CREDITING WAGERING ACTIVITY, issued as U.S. Pat. No. 11,210,897 on Dec. 28, 2021, which is a continuation of U.S. patent application Ser. No. 15/833,655, filed Dec. 6, 2017, entitled SYSTEMS AND METHODS FOR CREDITING WAGERING ACTIVITY, issued as U.S. Pat. No. 10,460,562 on Oct. 29, 2019, which is a continuation of U.S. patent application Ser. No. 15/627,516, filed Jun. 20, 2017, entitled SYSTEMS AND METHODS FOR CREDITING WAGERING ACTIVITY, issued as U.S. Pat. No. 9,865,130 on Jan. 9, 2018, which is a continuation of U.S. patent application Ser. No. 14/813,718, filed Jul. 30, 2015, entitled SYSTEMS AND METHODS FOR CREDITING WAGERING ACTIVITY, issued as U.S. Pat. No. 9,715,785 on Jul. 25, 2017, which claims the benefit of U.S. provisional patent application Ser. No. 62/141,823, filed on Apr. 1, 2015, entitled SYSTEMS AND METHODS FOR CREDITING WAGERING ACTIVITY, the disclosures of which are incorporated herein by reference in their entirety.

BACKGROUND

Within gaming establishments, such as casinos, players can place wagers by supplying funds to a gaming device. The funds provided by the player remain at the point of wagering (such as a slot machine, drop box, or other collection point) until a representative of the gaming establishment, such as a member of a drop team, physically removes the funds that were tendered by the player. The funds are then typically transported to a soft count room within the gaming establishment. Eventually, the collected funds are counted, bundled, and prepared for transport to a financial institution for deposit. At a later point in time, an armored vendor physically transfers the bundled funds from the gaming establishment to the financial institution. Once the funds reach the financial institution, they are eventually processed and deposited into a financial account of the gaming establishment.

Based on this labor intensive and time consuming process, an undesirable amount of time can pass between when a wager is placed by the player and when a financial account of the gaming establishment is ultimately credited with the deposit. This period of time can be further extended when financial institutions are not be available to accept cash deposits and/or when armored vendors are not available to transport the funds, such as over weekends, after hours, or on holidays. During this period of time, the gaming establishment is not able to draw interest, use, or otherwise benefit from the funds that have been wagered by players at gaming devices of the gaming establishment.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1A:
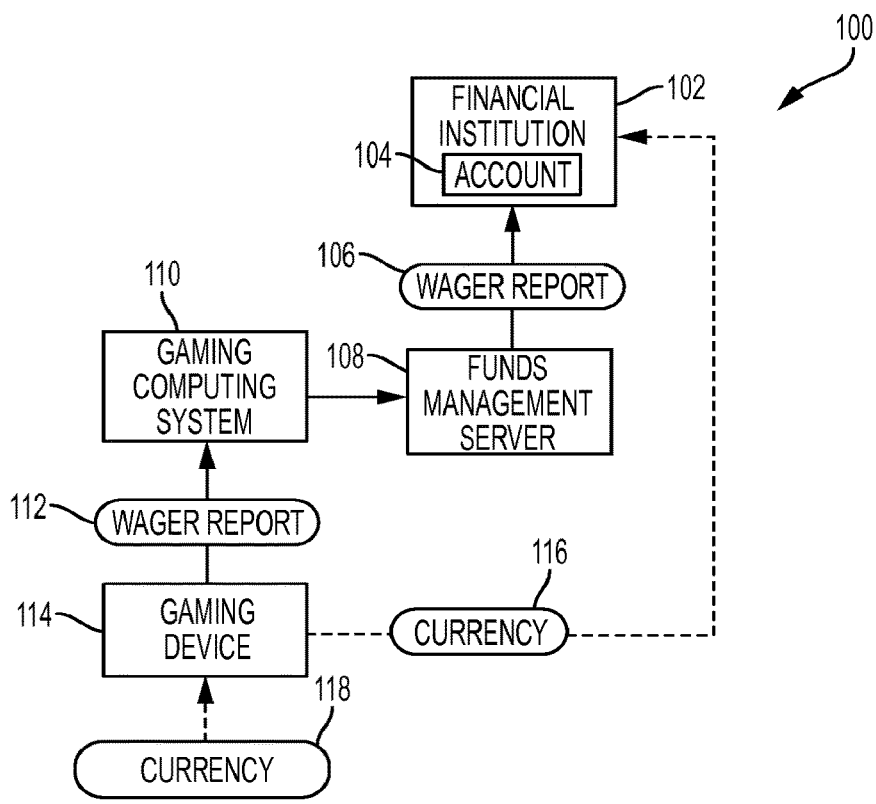
FIGS. 1A-1B depict example system diagrams utilizing a funds management server to facilitate provisionally crediting of financial accounts based on wagering activity in accordance with non-limiting embodiments.

Various non-limiting embodiments of the present disclosure will now be described to provide an overall understanding of the principles of the structure, function, and use of the wager crediting processes disclosed herein. One or more examples of these non-limiting embodiments are illustrated in the accompanying FIGS. 1-8, wherein like numbers indicate the same or corresponding elements throughout the examples. Those of ordinary skill in the art will understand that devices and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems and methods disclosed herein are described in detail by way of examples. The examples discussed herein are examples only and are provided to assist in the explanation of the systems and methods described herein. None of the features or components shown in the drawings or discussed below should be taken as mandatory for any specific implementation of any of these devices and methods unless specifically designated as mandatory. For ease of reading and clarity, certain components or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding, some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The presently disclosed system and methods can generally allow for a gaming establishment (or operator thereof) to have access to certain funds before the funds are physically deposited into a financial account of the gaming operator or a financial account that is otherwise held in favor of the gaming operator. Example gaming establishments can include, without limitation, brick and mortar casinos, virtual casino, gaming salons, off track betting parlors, race tracks, among other locations that have gaming devices or otherwise offer wagering to patrons, such as convenience stores, grocery stores, bars, or the like. Other examples of gaming establishments can include online gaming environments, such as online poker, online sports wagering, and online fantasy sports wagering. While the level of access granted to a gaming establishment can vary based on financial institution policy or a number of other considerations, in accordance with the present disclosure, a gaming establishment can accrue interest, or otherwise benefit, from wagered funds before the funds are physically removed from a gaming establishment and provided to the financial institution in the form of a cash deposit. In accordance with some embodiments, utilizing a funds management server a gaming establishment can monitor wagering at some or all of the plurality of its gaming devices (such as slot machines, electronic table games, traditional table games, and the like), and provide wager reporting to a financial institution. Generally, the wager reporting can identify an amount of net new cash received by the gaming establishment. The wager reporting can be provided to the financial institution using network communications in real-time, substantially real-time, in batch format, periodically, on-demand, or in accordance with any other suitable cycle or routine. In some embodiments the wager report is a data file, although this disclosure is not so limited. Upon receiving the wager reporting over a communications network, the financial institution can post a provisional credit to the financial account of the gaming establishment. The amount of net new cash identified on the wager reporting can include, for example, player funds provided to one or more gaming devices in the form of wagers. In this regard, the player funds can be tendered by the player in any suitable format, such as a physical currency (bills or coins) or electronic transfer of funds using a payment vehicle. For simplicity, a "payment vehicle" generally refers to any type of financial alternative to currency, such as credit cards, debit cards, smart cards, single-use cards, pre-paid cards, general purpose reloadable card, and the like, as well as other form of electronic payment, such as digital wallets and other online fund transfers. Additional examples of utilizing electronic funds for gaming can be found in U.S. Pat. Nos. 8,708,809; 8,777,725; 8,998,708; U.S. Pat. App. Pub. No. 2014/0324680; and U.S. Pat. App. Pub. No 2015/0011283, each of which is hereby incorporated by reference herein in its respective entirety.

In view of the received wager reporting, the financial institution can be configured to apply a credit for the wagered funds, referred to herein as a "provisional credit" since the crediting occurs in advance of the receipt of the actual funds. The provisional credit can be for the full amount of wagered funds or a reduced amount of the wagered funds. For example, the provisional credit can be applied for 50%, 75%, or 90% of the amount provided in wager report. In some embodiments, the particular percentage can vary based on a number of factors, such as the amount of wagering, the gaming establishment, historical financial figures, the type of gaming device(s) receiving the wager, and so forth. Additionally or alternatively, the provisional credit amount applied to an account can be limited to a maximum amount of funds. Upon the financial institution posting the provisional credit, the gaming establishment can generally begin to benefit from those funds, such as by accruing interest or otherwise utilizing or accessing the funds as working capital.

In accordance with some embodiments, gaming devices on a gaming establishment floor can function as a "virtual vault", as player funds deposited into the gaming device by a player (or dealer on behalf of the player) can be made available to the gaming establishment prior to the funds being physically removed from the gaming device for further processing and handling, as described in more detail below. With regard to players utilizing a payment vehicle to fund wagers, either at a physical gaming device or via an online environment, the gaming establishment can have access to the electronic funds before the funds are settled to the gaming establish through the typical payment network settlement process. Thus, in some implementations, gaming devices on the floor of a gaming establishment can be a virtual vault, thereby facilitating the gaming operator to access net new wagered funds upon those funds being tendered to the virtual vaults.

Eventually, with respect to currency-based wagers, the gaming establishment will tend to physically accessing the funds and collecting the funds that were wagered so the funds can be counted and bundled for transport to the financial institution for cash deposit. In some cases, the cash deposit may occur more than 1-2 business days after the wager was originally placed by the player. The financial institution receiving the cash deposit can be the same or different financial institution as the financial institution that issued the provisional credits. When the is the financial institution receiving the cash deposit is the financial institution that issued the provisional credit, once the funds are physically deposited at the financial institution, treasury management techniques can be used by the financial institution or affiliated entity to account for any differences between the provisional credit and the amount deposited, with the resulting credit amount being applied to the financial account (i.e., the full credit). For situations in which the deposited amount is less than the amount of the provisional credit, interest that was earned on the provisional credit beyond the deposit amount can be rescinded and/or other benefits can be revoked or reversed.

In some embodiments, a gaming establishment may be affiliated with two or more financial institutions. For example, a first financial institution can be used to provide provisional crediting and a second, unaffiliated financial institution can be used by the gaming establishment to receive its cash deposits. As described in more detail below, once the physical funds in a gaming device are accessed, provisional credits provided by the first financial institution associated with those physical funds can be reversed. The physical funds can then be collected, counted and eventually deposited in a second financial institution. The gaming operator can still gain a first benefit from the funds while they remain in the gaming device (i.e., in the form of provisional credits). While it will not necessarily gain a benefit from those funds while they are being transported from the gaming environment to the second financial institution, it will gain a second benefit once they are deposited into the an account at the second financial institution (i.e., in the form of full credits).

The funds management server can collect wagering information from any suitable gaming device that can provide financial information using network communications. In one embodiment, the funds management server can utilize data collected from a slot management system (SMS), a table management system (TMS), a casino management system (CMS), a cage management system, and/or other gaming computing systems which serve as a centralized processing hub for slot machines, table games and/or other wagering or fund transfers within a gaming environment. In one embodiment, the funds management server can utilize data collected from gaming devices such as drop boxes at table games, registers/terminals at casino cages, kiosks, wagers placed at sports/race books, poker rooms, and so forth. For online or virtual gaming establishments, the funds management server can utilize data collected by various gaming or payment processing servers associated with the online or virtual gaming. The gaming establishment can electronically communicate with a funds management server using any suitable communication techniques or protocols. In some environments, such messages are received via a communications network, such as the SPAN™ network offered by Sightline Interactive LLC of Las Vegas, Nevada. In some embodiments, the communications are received through an application programing interface (API) or other web-based messaging. In some embodiments, a gaming device can be configured to communicate wagering information directly to a funds management server. Irrespective of the gaming device used to collect or receive the wager, in accordance with the systems and methods disclosed herein, a gaming establishment can enjoy the benefits from provisional credits for a period of time before the physical funds associated with that wager are physically deposited or otherwise settled to a financial institution.

FIG. 1A depicts an example system diagram 100 utilizing a funds management server 108 to facilitate provisionally crediting of a financial account 104 based on wagering activity at a gaming device 114 in accordance with one non-limiting embodiment. The gaming device 114 can be any type of gaming system, unit, device, or machine that can electronically provide a wager report 112 to a gaming computing system 110 over a communications network. For example, in one embodiment, the gaming device 114 can be a slot machine that is in communication with a slot management system (SMS) of a gaming environment. In another embodiment, the gaming device 114 is a networked drop box or bill collector that can be associated with, for example, one or more table games, a poker room, a race/sports book, or other wagering arena in which funds are collected from a player for wagering. The wager report 112 can indicate the amount of currency 118, sometimes referred to as net new cash, as well as other relevant information, such as timestamps, device ID, player information, and so forth. The wager report 112 can also delineate between forms of funds, such as a paper currency, coins, and vouchers. The wager report 112 can be provided to the gaming computing system 110 in real-time, substantially real-time, in batch, or in response to a request from the gaming computing system 110, for example.

The gaming computing system 110 can be, for example, a casino management system (CMS), a slot management system (SMS), a table management system (TMS), a casino management system (CMS), a cage management system and/or any other system or collection of systems that generally monitor wagering activity, as well as combinations thereof. FIG. 1A depicts the gaming device 114 communicating directly with the gaming computing system 110 for schematic purposes. One skilled in the art should appreciate that any number of additional device, services, switches, routers, gateways, and other network hardware elements can be included in the communication chain. In any event, the gaming computing system 110 can be in networked communication with a funds management server 108. The funds management server 108 can be remote system or, in some embodiments, can be considered a component of the gaming computing system 110. The gaming computing system 110 can be in communication with the funds management server 108 over communications network, such as the SPAN™ network offered by Sightline Interactive LLC of Las Vegas, Nevada. The gaming computing system 110 can communicate the wagering information to the funds management server 108. In some embodiments, the wager report 112 received from the gaming device 114 is passed along to the funds management server 108. As may be desired, a plurality of wager reports 112 can be aggregated before transmitting the wagering information to the funds management server 108. Furthermore, the wagering information can be provided to the funds management server 108 in real-time, substantially real-time, in batch, upon other intervals or periods, or based on certain triggers or events.

The funds management server 108 can communicate with both the gaming computing system 110 and one or more financial institutions 102. In some embodiments, there is a one-to-one relationship between a funds management server 108 and a gaming computing system 110. In other embodiments, the funds management server 108 can service many different gaming computing systems 110 in a one-to-many relationship. Similarly, the funds management server 108 can be in networked communication with one or more financial institutions 102, as may be needed based on where the financial accounts of a particular gaming establishment are maintained (i.e., in a many-to-many relationship).

The funds management server 108 can communicate financial information to the financial institution 102. This financial information is schematically illustrated as wager report 106. The wager report 106 can include any information as may be needed by the financial institution 102 to post a provisional credit to the financial account 104. The wager report 106 can include, for example, the amount of net new cash collected at one or more gaming devices 114 over a certain time period, such as since a previous wager report was transmitted. In some embodiments, the wager report 106 is transmitted to the financial institution 102 periodically, such as an hourly or daily. In some embodiments, the wager report 106 is transmitted to the financial institution 102 in real-time or substantially real-time as the gaming computing system 110 transmits wagering information to the funds management server 108. In some embodiments, wagering information is aggregated at the gaming computing system 110. In some embodiments the funds management server 108 aggregates wagering information prior to transmitting to the financial institution 102.

The financial institution 102 can post a provisional credit to the financial account 104 that is associated with the gaming establishment at which the wagering occurred. The value of the provisional credit can be for the full amount of funds identified in the wager report 106 or for a partial amount. For example, the provisional credit can be given for 50%, 75%, or 90% of the amount provided in wager report. Additionally or alternatively, the value of the provisional credit can be subject to minimum or maximum thresholds. For example, the provisional credit will only be posted if it exceeds a certain dollar amount, but provisional credits will only be posted up to a certain dollar amount. Upon the financial institution posting the provisional credit, the gaming establishment can generally begin to benefit from those funds, such as by accruing interest or otherwise utilizing the funds.

Still referring to FIG. 1A, eventually currency 116 will be physically removed from the gaming device 114 for processing by the gaming establishment. As is known in the art, the currency 116 can be transferred to a count room for counting and bundling. The bundled funds are eventually physically transported, typically via armored vendor, to a branch of the financial institution 102 maintaining the financial account 104 of the gaming establishment. In accordance with the present disclosure, some or all of the funds delivered to the financial institution 102 may have already been credited to the financial account 104 in the form of a provisional credit. Through treasury management techniques, the financial institution 102 can process the physical funds during an intake process and rectify and convert the provisional credits to full credits, as may be appropriate. In some cases, a provisional credit may have been issued that is greater than the amount of the corresponding physical funds that are eventually deposited. Any interest or other benefit that may have been accrued by the gaming establishment can be rescinded, as may be needed based on accounting procedures for processing provisional credits.

Figure 1B:
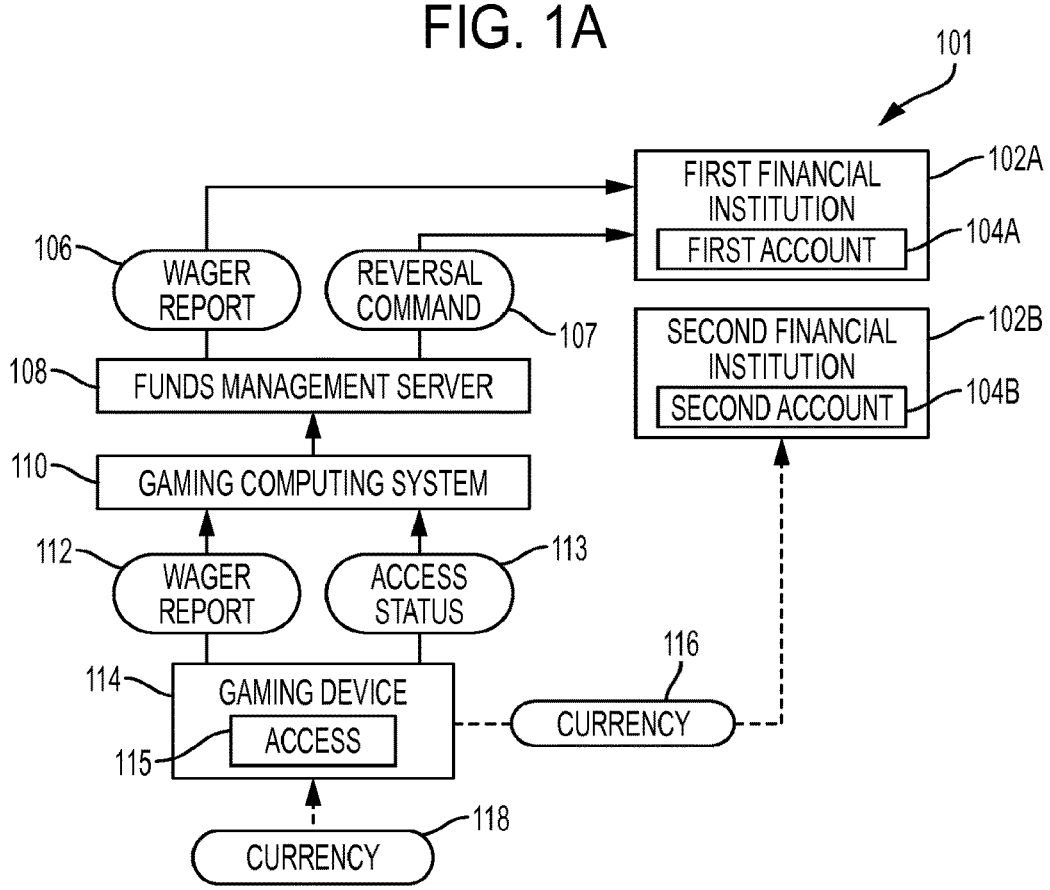

Referring now to FIG. 1B, an example system diagram 101 is depicted that utilizes the funds management server 108 to facilitate provisionally crediting of a first financial account 104A based on wagering activity at the gaming device 114. In this embodiment, the currency 116 will be physically removed from the gaming device 114 and eventually be deposited in a second financial institution 102B. The currency 116 within the gaming device 114 can be retrieved through the point of access 115. In some embodiments, the point of access 115 is a door, panel, gate, drawer, or other assembly that restricts access and is typically in a closed position. The point of access 115 can be opened to retrieve the currency 118, or in some cases, for other events, such as to clear a jam, repair the gaming device, and so on. The gaming device 114 can monitor the point of access 115 and when a condition is satisfied (i.e., the point of access is opened), the gaming device 114 can provide an indication to the gaming computing system 110, shown in FIG. 1B as point of access status 113. In some cases the point of access 115 may be accesses relatively frequently (i.e., hourly or daily) or in other cases, the point of access 115 may remained closed for longer periods of time (such as days or weeks).

In the embodiment illustrated in FIG. 1B, and as shown in FIG. 1A, the wager report 112 can indicate the amount of currency 118, sometimes referred to as net new cash, as well as other relevant information, such as timestamps, device ID, player information, and so forth. The wager report 112 can also delineate between forms of funds, such as a paper currency, coins, and vouchers. The wager report 112 can be provided to the gaming computing system 110 in real-time, substantially real-time, in batch, or in response to a request from the gaming computing system 110, for example. The gaming computing system 110 can communicate the wagering information to the funds management server 108. In some embodiments, the wager report 112 received from the gaming device 114 is passed along to the funds management server 108. As may be desired, a plurality of wager reports 112 can be aggregated before transmitting the wagering information to the funds management server 108. Furthermore, the wagering information can be provided to the funds management server 108 in real-time, substantially real-time, in batch, upon other intervals or periods, or based on certain triggers or events. The funds management server 108 can communicate with both the gaming computing system 110 and one or more financial institutions 102A, 102B.

In the illustrated embodiment, the funds management server 108 in closed-loop communication with the first financial institution 102A. The funds management server 108 can communicate financial information to the first financial institution 102A, which is schematically illustrated as wager report 106. The wager report 106 can include any information as may be needed by the first financial institution 102A to post a provisional credit to the first financial account 104A. The wager report 106 can include, for example, the amount of net new cash collected at one or more gaming devices 114 over a certain time period, such as since a previous wager report was transmitted. In some embodiments, the wager report 106 is transmitted to the first financial institution 102A periodically, such as an hourly or daily. In some embodiments, the wager report 106 is transmitted to the first financial institution 102A in real-time or substantially real-time as the gaming computing system 110 transmits wagering information to the funds management server 108. In some embodiments, wagering information is aggregated at the gaming computing system 110. In some embodiments the funds management server 108 aggregates wagering information prior to transmitting to the first financial institution 102A.

Similar to FIG. 1A, the first financial institution 102A can post a provisional credit to the first financial account 104A that is associated with the gaming establishment at which the wagering occurred. In this embodiment, however, the first financial account 104A is a different account then will ultimately receive cash deposits. The value of the provisional credit posted to the first financial account 104A can be for the full amount of funds identified in the wager report 106 or for a partial amount. For example, the provisional credit can be given for 50%, 75%, or 90% of the amount provided in wager report. Additionally or alternatively, the value of the provisional credit can be subject to minimum or maximum thresholds. For example, the provisional credit will only be posted if it exceeds a certain dollar amount, but provisional credits will only be posted up to a certain dollar amount. Upon the first financial institution 102A posting the provisional credit, the gaming establishment can generally begin to benefit from those funds, such as by accruing interest or otherwise utilizing the funds.

Still referring to FIG. 1B, subsequent to the provisional credit being posted by the first financial institution 102A, the currency 116 will eventually be physically removed from the gaming device 114 for processing by the gaming establishment for deposit at the second financial institution 102B. To physically remove the currency 116, the point of access 115 can be utilized. Upon detection of the access event, the gaming device 114 can transmit the access status 113 so that the gaming computing system 110 receives notice of the access event. The gaming computing system 110 can relay this information to the funds management server 108. The funds management server 108 can then issue a reversal command 107 to the first financial institution 102A. The reversal command 107 can include an amount of provisional credits that are to be reversed. This amount can be based on, for example, the amount of currency 116 that was known to be in the hopper of the gaming device 114 (or collection of gaming devices 114) that experienced the access event. This amount of currency 116 can be the amount of currency collected by the gaming device 114 since the previously occurring access event. The currency 116 can be physically removed from the gaming device 114 and transferred to a count room for counting and bundling, as described above. The bundled funds are eventually physically transported, typically via armored vendor, to a branch of the second financial institution 102B maintaining the second financial account 104B of the gaming establishment. The funds can then be deposited into the second financial account 104B for the benefit of the gaming operator. Accordingly, in this embodiment, the gaming operator can gain benefit from the currency while it is maintained within the gaming device (i.e. via the provisional credits posted by the first financial institution), thereby reducing the need for a gaming operator to physically remove the currency from the gaming device to gain the benefit from the currency.

Figure 2:
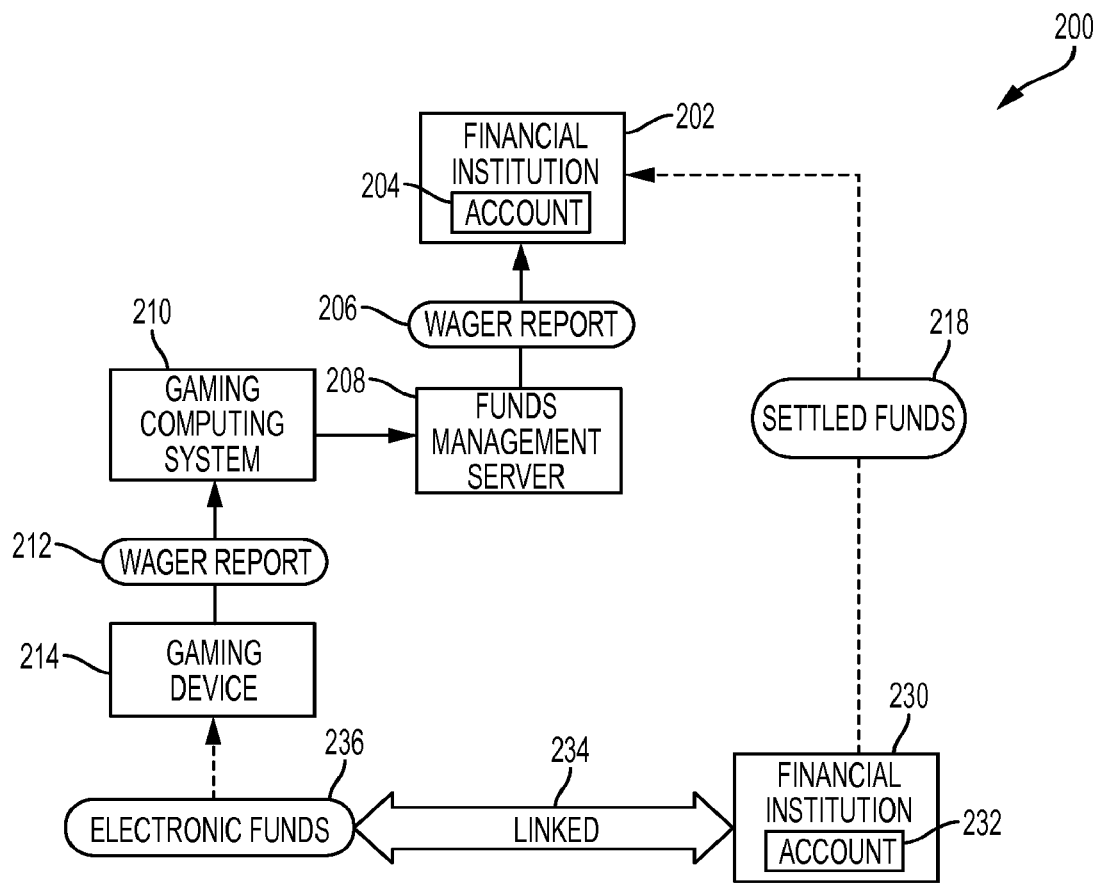
FIG. 2 depicts an example system diagram utilizing a funds management server to facilitate provisionally crediting of a financial account based on wagering activity in accordance with another non-limiting embodiment.

While FIGS. 1A-1B depict the provisional crediting of currency 118 that is wagered at a gaming device 114, this disclosure is not so limited. Referring now to FIG. 2, an example system diagram 200 is depicted that utilizes a funds management server 208 to facilitate provisionally crediting of a financial account 204 based on wagering activity at a gaming device 214 when a player utilizes electronic funds 236. The electronic funds 236 can be linked to an account 232 at a financial institution 230. In some embodiments, the linkage 234 is a payment vehicle, such as a general purpose reloadable card or otherwise linked to a digital wallet, bank account, or other repository of funds. For illustrative purposes, the financial institution 230 depicted in FIG. 2 is the issuer of the payment vehicle utilized by the player for wagering. Similar to FIGS. 1A-1B, the gaming device 214 can be any type of gaming system, unit, device, or machine that can electronically provide a wager report 212 to a gaming computing system 210 over a communications network. For example, in one embodiment, the gaming device 214 can be a slot machine that is in communication with a slot management system (SMS) of a gaming environment. In another embodiment, the gaming device 214 is a networked drop box, POS terminal, or other fund input device that can be associated with, for example, one or more table games, a poker room, a race/sports book, or other wagering arena in which electronic funds 236 are collected from a player for wagering. In another embodiment, the gaming device 214 represents and online or virtual gaming environment. The wager report 212 can indicate the amount of electronic funds 236, sometimes referred to as net new cash, as well as other relevant information, such as timestamps, device ID, payment vehicle information, player information, and so forth. The wager report 212 can be provided to the gaming computing system 210 in real-time, substantially real-time, in batch, or in response to a request from the gaming computing system 210, for example.

Similar to FIGS. 1A-1B, the gaming computing system 210 can be, for example, a casino management system (CMS), a slot management system (SMS), a table management system (TMS), a casino management system (CMS), a cage management system and/or any other system or collection of systems that generally monitor wagering activity, as well as combinations thereof. While FIG. 2 depicts the gaming device 214 communicating directly with the gaming computing system 210 for schematic purposes, any number of additional device, services, switches, routers, gateways, and other network hardware elements can be included in the communication chain. In any event, the gaming computing system 210 can be in networked communication with a funds management server 208. The funds management server 208 can be remote system or, in some embodiments, can be considered a component of the gaming computing system 210. The gaming computing system 210 can be in communication with the funds management server 208 over communications network, such as the SPAN™ network offered by Sightline Interactive LLC of Las Vegas, Nevada. The gaming computing system 210 can communicate the wagering information to the funds management server 208. In some embodiments, the wager report 212 received from the gaming device 212 is passed along to the funds management server 208. As may be desired, a plurality of wager reports 212 can be aggregated before transmitting the wagering information to the funds management server 208. Furthermore, the wagering information can be provided to the funds management server 208 in real-time, substantially real-time, in batch, upon other intervals or periods, or based on certain triggers or events.

The funds management server 208 can communicate with both the gaming computing system 210 and one or more financial institutions 202. In some embodiments, there is a one-to-one relationship between a funds management server 208 and a gaming computing system 210. In other embodiments, the funds management server 208 can service many different gaming computing systems 210 in a one-to-many relationship. Similarly, the funds management server 208 can be in networked communication with one or more financial institutions 202, as may be needed based on where the financial accounts of a particular gaming establishment are maintained (i.e., in a many-to-many relationship).

The funds management server 208 can communicate financial information to the financial institution 202. This financial information is schematically illustrated as wager report 206. The wager report 206 can include any information as may be needed by the financial institution 202 to post a provisional credit to the financial account 104. The wager report 206 can include, for example, the amount of net new cash collected at one or more gaming devices 114 via electronic funds 236 over a certain time period, such as since a previous wager report was transmitted. In some embodiments, the wager report 206 is transmitted to the financial institution 202 periodically, such as an hourly or daily. In some embodiments, the wager report 206 is transmitted to the financial institution 202 in real-time or substantially real-time as the gaming computing system 210 transmits wagering information to the funds management server 108. In some embodiments, wagering information is aggregated at the gaming computing system 210. In some embodiments the funds management server 208 aggregates wagering information prior to transmitting to the financial institution 202.

Similar to the embodiment described above with respect to FIG. 1A, the financial institution 202 can post a provisional credit to the financial account 204 that is associated with the gaming establishment at which the wagering occurred. Eventually settled funds 218 will be received from the financial institution 230 (i.e., via an automated clearinghouse (ACH) transaction) based on the transaction that previously occurred at the gaming device 214 to initiate the wagering. In accordance with the present disclosure, some or all of the funds settled to the financial institution 202 may have already been credited to the financial account 204 in the form of a provisional credit. Through treasury management techniques, the financial institution 202 can process the settled funds and rectify and convert the provisional credits to full credits, as may be appropriate.

Figure 3:
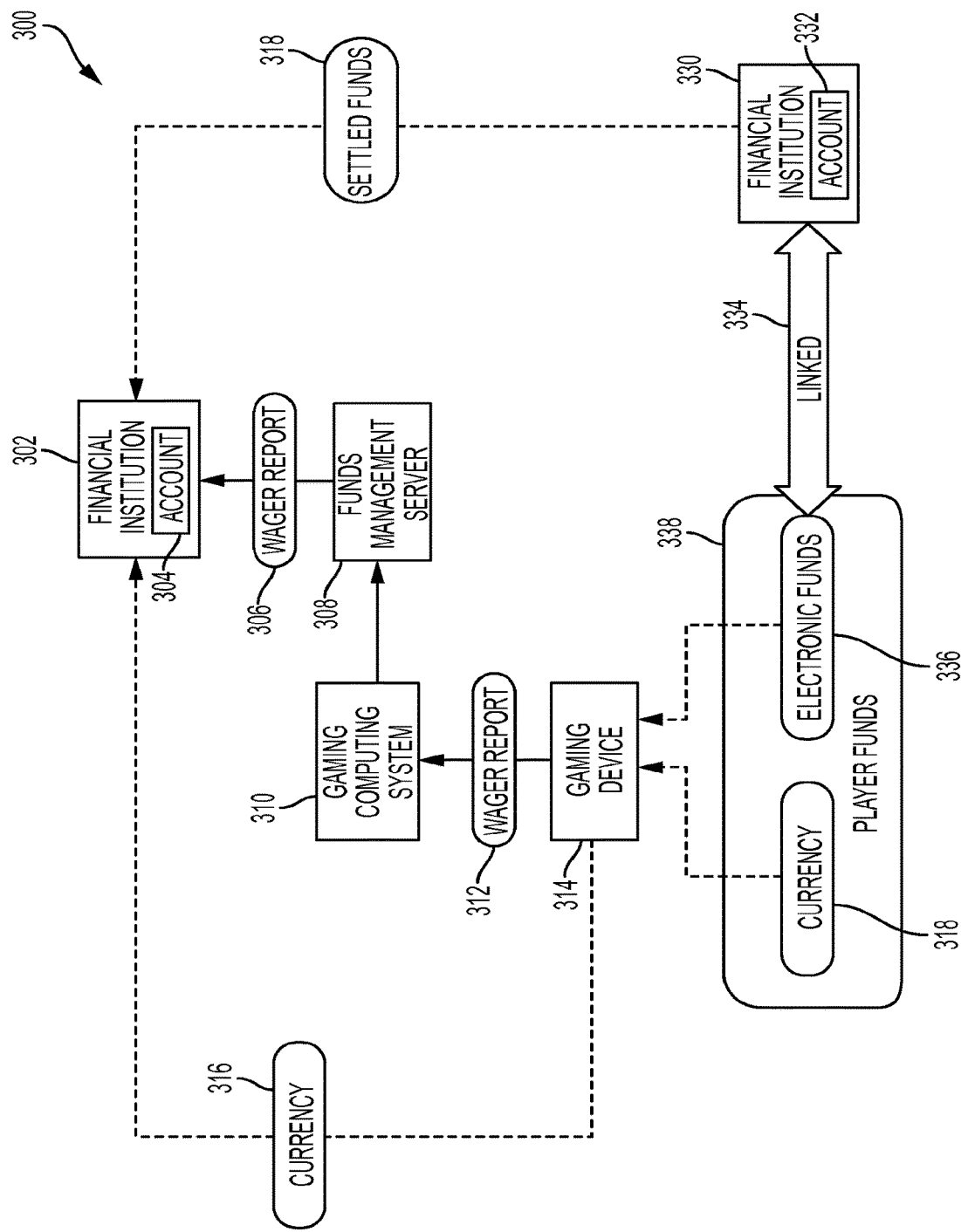
FIG. 3 depicts an example system diagram utilizing a funds management server to facilitate provisionally crediting of a financial account based on wagering activity in accordance with yet another non-limiting embodiment.

FIG. 3 depicts an example system diagram 300 in which a gaming device 314 can received multiple modalities of player funds 338, illustrated as currency 318 and electronic funds 336. As shown, a funds management server 308 can facilitate provisionally crediting of a financial account 304 based on wagering activity at a gaming device 314 when a player wagers with player funds 338. With regard to electronic funds 336, the funds can be linked to an account 332 at a financial institution 330. Similar to previously described embodiments, the gaming computing system 310 can be in networked communication with a funds management server 308. The funds management server 308 can be remote system or, in some embodiments, can be considered a component of the gaming computing system 310. The gaming computing system 310 can be in communication with the funds management server 108 over communications network, such as the SPAN™ network offered by Sightline Interactive LLC of Las Vegas, Nevada. The gaming computing system 310 can communicate the wagering information to the funds management server 308. In some embodiments, the wager report 312 received from the gaming device 312 is passed along to the funds management server 308. The funds management server 308 can communicate with both the gaming computing system 310 and one or more financial institutions 302.

The funds management server 308 can communicate financial information to the financial institution 302. This financial information is schematically illustrated as wager report 306. The wager report 306 can include any information as may be needed by the financial institution 302 to post a provisional credit to the financial account 304. The wager report 306 can include, for example, the modality of player funds, the amount of net new cash collected at one or more gaming devices 314 over a certain time period, such as since a previous wager report was transmitted. In some embodiments, the wager report 306 is transmitted to the financial institution 302 periodically, such as an hourly or daily. In some embodiments, the wager report 306 is transmitted to the financial institution 302 in real-time or substantially real-time as the gaming computing system 310 transmits wagering information to the funds management server 308. In some embodiments, wagering information is aggregated at the gaming computing system 310. In some embodiments the funds management server 308 aggregates wagering information prior to transmitting to the financial institution 302.

The financial institution 302 can post a provisional credit to the financial account 304 that is associated with the gaming establishment at which the wagering occurred. Eventually, for currency-based wagers, the currency 316 will be physically removed from the gaming device 314 for processing by the gaming establishment. The currency 316 can be transferred to a count room for counting and bundling. The bundled funds are eventually physically transported to a branch of the financial institution 302 maintaining the financial account 304 of the gaming establishment. In accordance with the present disclosure, some or all of the funds delivered to the financial institution 302 may have already been credited to the financial account 304 in the form of a provisional credit. Through treasury management techniques, the financial institution 302 can process the physical funds during an intake process and rectify and convert the provisional credits to full credits, as may be appropriate. Additionally, eventually settled funds 318 will be received from the financial institution 330 (i.e., via an automated clearinghouse (ACH) transaction) based on the transaction that previously occurred at the gaming device 314. In accordance with the present disclosure, some or all of the funds settled to the financial institution 302 may have already been credited to the financial account 304 in the form of a provisional credit. Through treasury management techniques, the financial institution 302 can also process the settled funds and rectify and convert the provisional credits to full credits, as may be appropriate.

Figure 4:
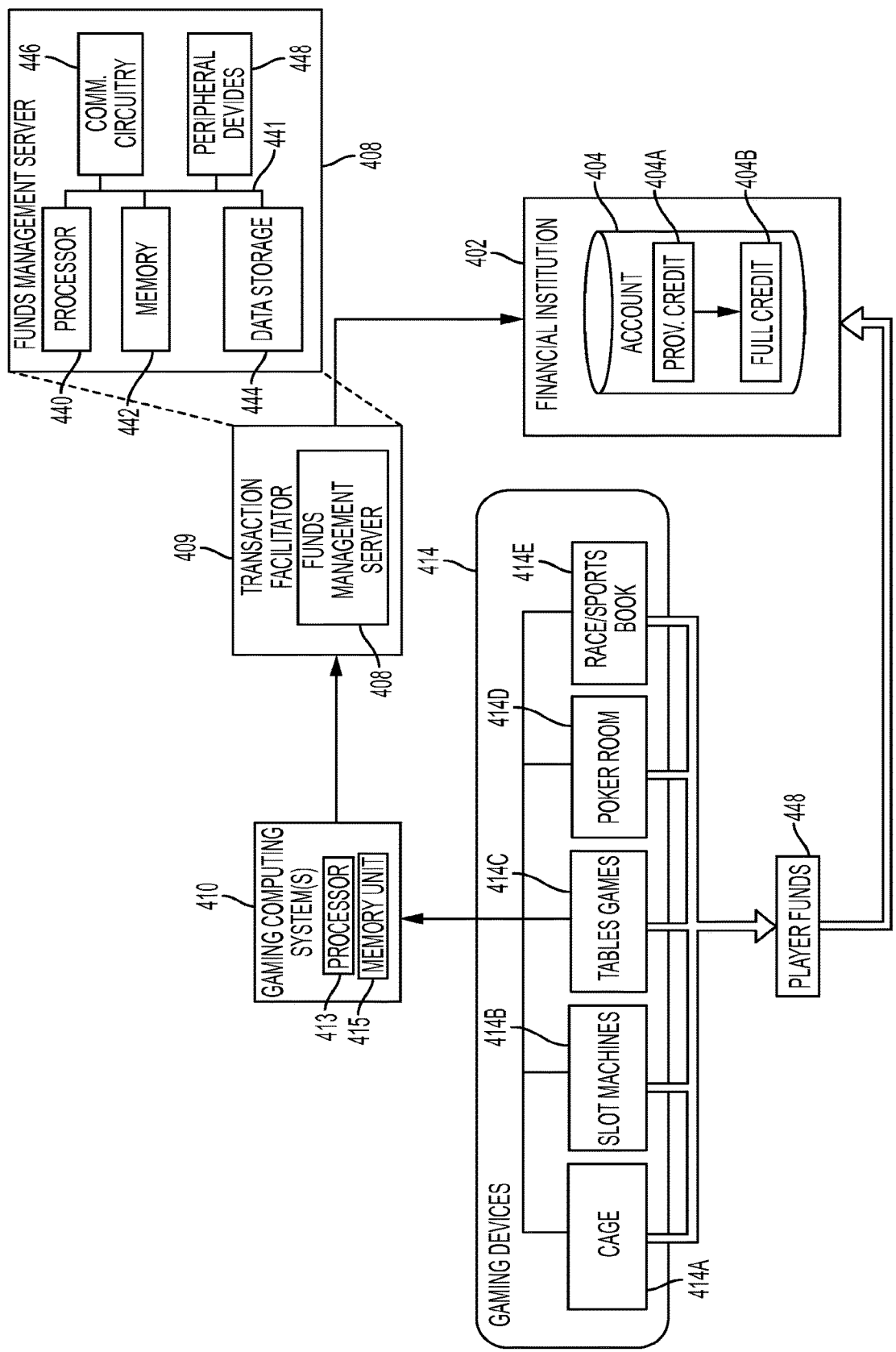
FIG. 4 depicts an example system diagram utilizing a funds management server to facilitate provisionally crediting of a financial account based on wagering activity at a variety of different gaming devices in accordance with one non-limiting embodiment.

FIG. 4 depicts an example system diagram utilizing a funds management server 408 to facilitate provisionally crediting of a financial account 404 based on wagering activity at a variety of different gaming devices 514 in accordance with one non-limiting embodiment. In FIG. 4, the gaming devices are schematically illustrated as a cage 414A, slot machines 414B, table games 414C, a poker room 414D, and a race/sports book 414E. Each of these devices is configured to provide wager reports to a gaming computing system 410, which can include one or more processors 413 and one or more computer memory units 415. For convenience, only one processor 413 and only one memory unit 415 are shown in FIG. 4. The processor 413 can execute software instructions stored on the memory unit 415. The processor 413 can be implemented as an integrated circuit (IC) having one or multiple cores. The memory unit 415 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example. In some embodiments, the gaming computing system 410 can execute the slot management system (SMS), table management system (TMS), cage management system, and/or the casino management system (CMS), as described above.

A funds management server 408 can be hosted by or otherwise operated by a transaction facilitator 409. The transaction facilitator 409 can have one or more processors and one or more computer memory units. The transaction facilitator 409 can also be in closed communication with a financial institution 402 that maintains a financial account 404 associated with a gaming establishment at which wagering is transpiring. It is noted that while the transaction facilitator 409 is schematically illustrated as a single entity, it is to be appreciated that this disclosure is not so limited. Instead, the functionality of the transaction facilitator 409, as described herein, can be distributed across, or otherwise performed by, a plurality of various entities, such payment gateways, acquirer processors, and other types of payment intermediaries. Also, the transaction facilitator 409, or at least components thereof, can reside within a gaming environment (see gaming environment shown in FIGS. 5 and 6, for example) or be controlled by an operator of the gaming environment. In such embodiment, the transaction facilitator 409 can be configured to communicate with financial institution 402 through a secured communication link. Further, the transaction facilitator 409, or at least components thereof, can be controlled by the financial institution 402. Therefore, the transaction facilitator 409 may be operated by, or otherwise controlled by a variety of different entities. The transaction facilitator 409 can also have a one-to-one processing relationship with a gaming computing system 410, as illustrated. It is to be appreciated, however, that the transaction facilitator 409 can also have a one-to-many configuration such that it has a processing relationship with a plurality of gaming computing systems or gaming computing systems associated with a plurality of different financial institutions. Furthermore, as described above with regard to FIG. 1B, in some implementations a first financial institution can be used to issue provisional crediting services and a second financial institution can be used to hold account(s) for cash deposits.

The funds management server 408 of the transaction facilitator 409 can be embodied as any type of computing device or server or capable of processing, communicating, storing, maintaining, and transferring data. For example, the funds management server 408 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the funds management server 408 can be embodied as a computing device integrated with other systems or subsystems. In the illustrative embodiment of FIG. 4, the funds management server 408 includes a processor 440, a system bus 441, a memory 442, a data storage 444, communication circuitry 446, and one or more peripheral devices 448. Of course, the funds management server 408 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 442, or portions thereof, can be incorporated in the processor 440 in some embodiments. Furthermore, it should be appreciated that the funds management server 408 can include other components, sub-components, and devices commonly found in a computer and/or computing device, which are not illustrated in FIG. 4 for clarity of the description.

The processor 440 can be embodied as any type of processor capable of performing the functions described herein. For example, the processor 440 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the funds management server 408 includes a system bus 441 for interconnecting the various components of the funds management server 408. The system bus 441 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 440, the memory 442, and other components of the funds management server 408. In some embodiments, the funds management server 408 can be integrated into one or more chips such as a programmable logic device or an application specific integrated circuit (ASIC). In such embodiments, the system bus 441 can form a portion of a system-on-a-chip (SoC) and be incorporated, along with the processor 440, the memory 442, and other components of the funds management server 408, on a single integrated circuit chip.

The memory 442 can be embodied as any type of volatile or non-volatile memory or data storage capable of performing the functions described herein. For example, the memory 442 can be embodied as read only memory (ROM), random access memory (RAM), cache memory associated with the processor 440, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 442 can store various data and software used during operation of the funds management server 408 such as operating systems, applications, programs, libraries, and drivers.

The data storage 444 can be embodied as any type of device or devices configured for short-term or long-term storage of data such as, for example, memory devices and circuits, memory cards, hard disk drives, solid-state drives, or other data storage devices. For example, in some embodiments, the data storage 444 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 440, or the memory 442 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 446 of the funds management server 408 may be embodied as any type of communication circuit, device, interface, or collection thereof, capable of enabling communications between the funds management server 408 and the financial institution 402 (or computing devices thereof), the gaming computing system 410 (or computing devices thereof), and/or any other computing device communicatively coupled thereto. For example, the communication circuitry 446 may be embodied as one or more network interface controllers (NICs), in some embodiments. The communication circuitry 446 may be configured to use any one or more communication technologies (e.g., wireless or wired communications) and associated protocols (e.g., Ethernet, Wi-Fi®, WiMAX, etc.) to effect such communication.

In some embodiments, the funds management server 408 and the financial institution 402, the gaming computing system 410 and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, a private/secure network, or a publicly-accessible, global network such as the Internet. Additionally, the network(s) can include any number of additional devices to facilitate communication between the computing devices of the system.

Additionally, in some embodiments, the funds management server 408 can further include one or more peripheral devices 448. Such peripheral devices 448 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

Similar to the system described in FIG. 3, one or more of the gaming devices 414 can be configured to electronically provide wagering information to the gaming computing system 410. In turn, the gaming computing system 410 can electronically provide wagering information (i.e. an amount of net new cash collected at one or more gaming devices) to the transaction facilitator 409 through network communication links. The funds management server 408 of the transaction facilitator 409 can, in turn, electronically provide wagering information to the financial institution 402 so that a provisional credit 404A can be posted to a financial account 404. At a later point in time, the player funds 448 will be deposited into the account 404. For player funds 448 that are physical currency, it will be taken from the gaming devices 414 and transferred to a count room. The counted and bundled funds can then be transported to a branch of the financial institution 402, at which point the provisional credit 404A can be converted (either fully or partially) to a full credit 404B. For players funds 448 that are electronic funds, the settled funds will eventually be received from an issuing financial institution or other repository (i.e., a demand deposit account of the player). Once received, the provisional credit 404A issued for those electronic funds can be converted (either fully or partially) to a full credit 404B.

In some implementations, the risk allocation of the various financial transactions can be split, apportioned, or transferred to various entities with this system. For example, in one embodiment, the transaction facilitator 409 can, optionally, assume the risk of making sure that the funds are ultimately deposited at the financial institution 402. In this arrangement, if the funds do not ultimately arrive at the financial institution 402, the financial institution 402 could seek recourse from the transaction facilitator 409.

Figure 5:
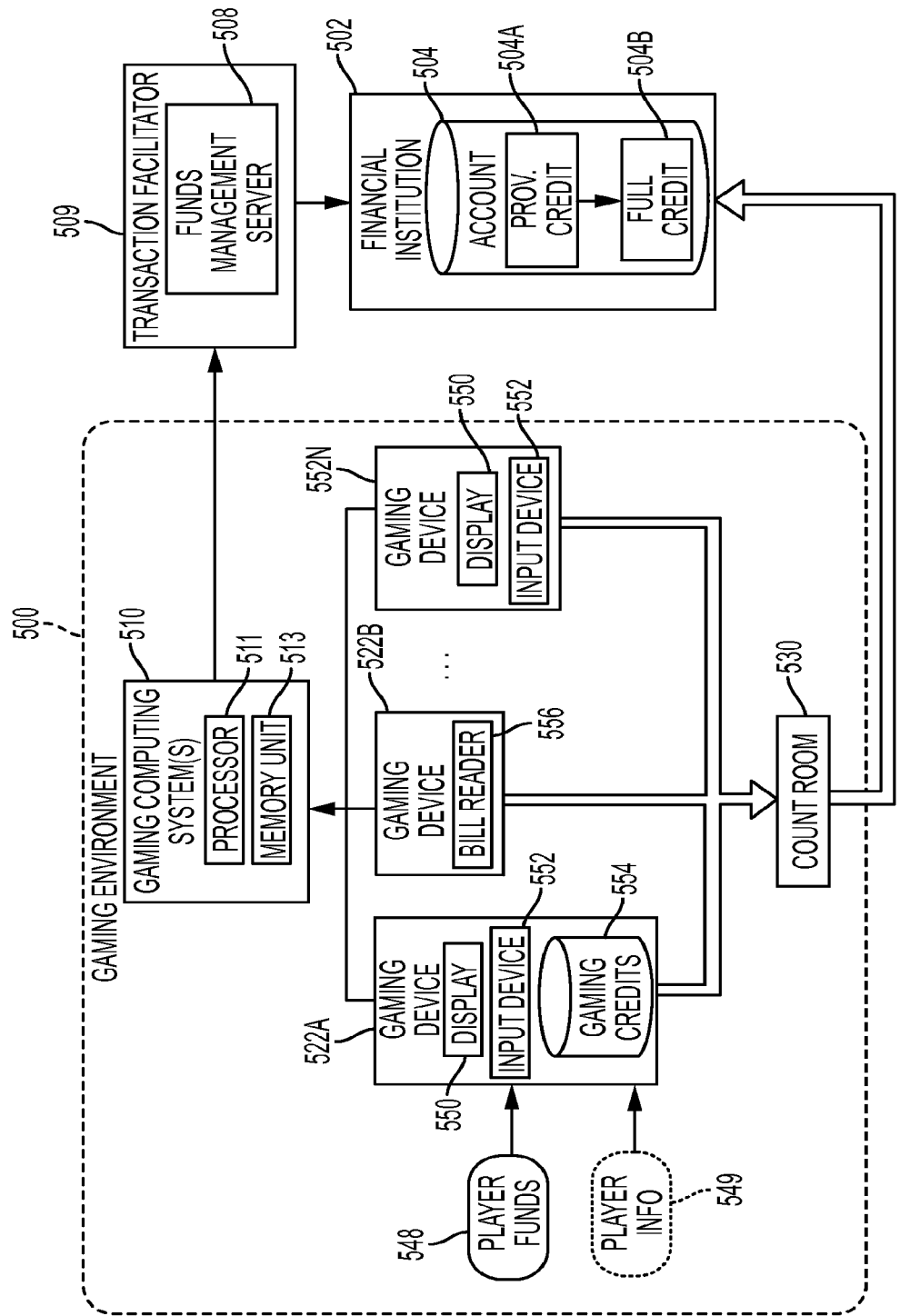
FIG. 5 depicts an example system diagram utilizing a funds management server to facilitate provisionally crediting of a financial account based on wagering activity at a variety of different gaming devices in accordance with one non-limiting embodiment.

FIG. 5 depicts an example system diagram utilizing a funds management server 508 of a transaction facilitator 509 to enable provisionally crediting of a financial account 504 based on wagering activity at a variety of different gaming devices each of which are within a gaming environment, in accordance with one non-limiting embodiment. In FIG. 5, the gaming devices are schematically illustrated as gaming devices 522A, 522B . . . 522N positioned within a gaming environment 500 (e.g. a brick-and-mortar casino). Each of the gaming devices 522A, 522B . . . 522N are configured to provide wager reports to a gaming computing system 510, which can include one or more processors 532 and one or more computer memory units 534.

The particular type, design and functionality of each of the gaming devices 522A, 522B . . . 522N can vary. Merely for the purposes of illustration, gaming device 522A is shown as a slot machine (or other video-based wagering game) having a display 550, an input device 552, and a counter 554 to track gaming credits. Gaming device 522B can be, for example, associated with a table game in which a player or dealer feeds currency into a bill reader 556. The gaming device 522B can also accept other forms of player funds, such as electronic funds. In some embodiments, the bill reader 556 is mounted proximate to the player surface of a table game such that a dealer, or other suitable person, can readily insert player funds during gameplay. Gaming device 522C can have a display 550 and an input device 552 and can be, for example, associated with a casino cage, poker room, or other wagering area in which player funds are tendered. The input device 552 can be a card reader, a bill reader, a NFC transponder, and so forth. In some embodiments, player information 549 (such as a player's card number) can also be provided to the gaming device by the player.

The gaming devices 522A, 522B . . . 522N can electronically provide wagering information to one or more gaming computing systems 510. In turn, the gaming computing system 510 can electronically provide wagering information to the transaction facilitator 509 through network communication links. In some embodiments, player information 549 is included in the data transmitted to the transaction facilitator 509. The funds management server 508 of the transaction facilitator 509 can, in turn, electronically provide wagering information to the financial institution 502 so that a provisional credit 504A can be posted to a financial account 504. At a later point in time, physical currency can be taken from the gaming devices 522A, 522B . . . 522N and transferred to a count room 530. The counted and bundled funds can then be transported to a branch of the financial institution 502, at which point the provisional credit 504A associated with the physical currency can be converted (either fully or partially) to a full credit 504B. Similarly, if electronic funds were used for wagering, at a later point in time, settled funds from an issuing bank can be received by the financial institution 502, at which point provisional credits 504A associated with the electronic funds can be converted (either fully or partially) to a full credit 504B.

Figure 6:
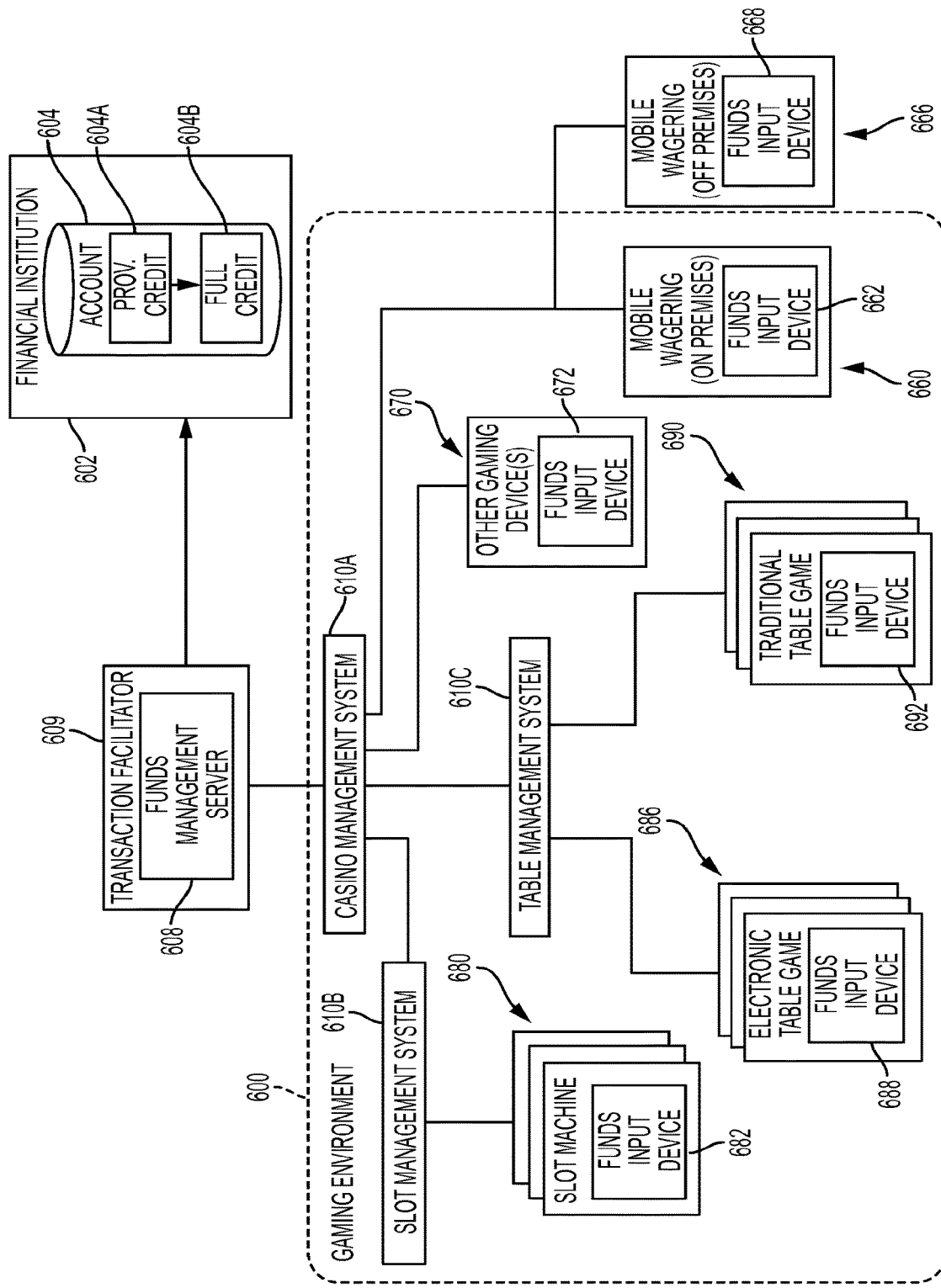
FIG. 6 depicts an example system diagram utilizing a funds management server to facilitate provisionally crediting of a financial account based on wagering activity at a variety of different gaming devices in accordance with one non-limiting embodiment.

FIG. 6 depicts an example operational environment in which a plurality of different types of gaming devices operating within a gaming environment each function as a virtual vaults. As illustrated, a gaming environment 600 is also shown to include a casino management system 610A that is communication with a slot management system 610B and a table management system 610C. The slot management system 610B is in communication with a plurality of slot machines 680, each of which includes a funds input device 682. Depending on the configuration of the slot machine 680, the funds input device 682 can receive player funds of varying modalities, such as currency, electronic funds, and so forth. As described above, as players provide player funds to each of the slot machines 680, wager reports can be electronically provided to the slot management system 610B throughout suitable network connectivity. The table management system 610C can be in communication with a plurality of table game types, such as electronic table games 686, traditional table games 690, as well as other types of table games, sometimes referred to as hybrid table games (not shown). Electronic table games 686 can generally simulate table gameplay through the use of various electronic displays and interactive elements. Each of the electronic table games 686 can include a funds input device 688 to receive player funds. Traditional table games 690 can include "felt top" games that include a live dealer. Each of the traditional table games 690 can include a fund input device 692 to receive player funds. In some embodiments, the dealer may place player funds into the fund input device 692 upon the player purchasing chips from the dealer. It is noted that any suitable technology can be used as the funds input device 692. For example, in some embodiments, video recognition technology can be used to determine the amount of funds tendered to the dealer from the player during a chip purchase event. In some embodiments, RFID technology, or other NFC technologies, incorporated into the chips or other aspects of the tables can similarly be used to track the wagering activity of the player.

As illustrated, various other gaming devices 670 can be in communication with the casino management system 610A. These gaming devices 670 can be located in a casino cage, a poker room, a race/sports book, and so forth. These gaming devices 670 can have a funds input device 672 to receive player funds (either directly from the player or via an intermediary, such as a cashier) and provide reporting to the casino management system 610A.

Furthermore, the casino management system 610A (or other suitable tracking system) can be used to monitor mobile-based wagering. Mobile-base wagering can include wagering occurring on a player's mobile computing device, such as a smart phone, tablet, desktop computer, laptop computer and so forth. In some embodiments, the mobile wagering is on premises, as depicted by mobile wagering 660. In some embodiments, the mobile wagering is off premises, as depicted by mobile wagering 666, In any event, a funds input device 662, 666 (such as a virtual POS) can be used to receive funds from the player, often in the form of electronic funds, and such wagering can be reported to the casino management system 610A.

The gaming computing system 610A can electronically provide wagering information to a transaction facilitator 609 through network communication links. A funds management server 608 of the transaction facilitator 509 can, in turn, electronically provide wagering information to the financial institution 602 so that provisional credits 604A can be posted to a financial account 604. As depicted, the provisional credits 604A can be posted as result from player funds being tendered to any number of fund input devices inside or outside the gaming environment 600. At a later point in time, physical currency will be taken from the gaming devices and transported to the financial institution 602 and/or settled funds from an issuing bank or other entity will be received by the financial institution 502. Once the currency and/or settled funds are received and processed, the provisional credits 604A associated with the electronic funds can be converted (either fully or partially) to a full credit 604B.

Figure 7:
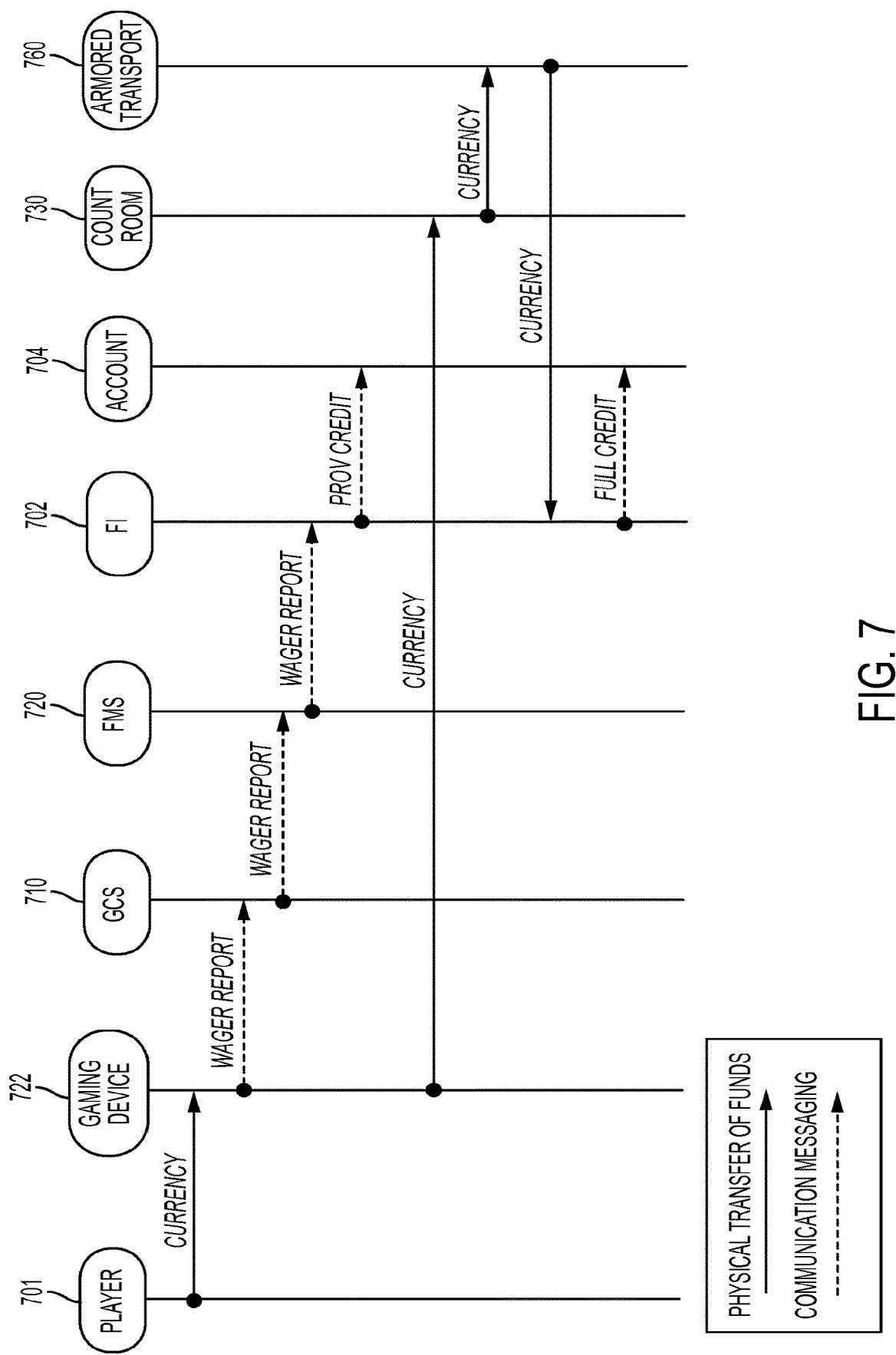
FIG. 7 depicts an example message sequence chart in accordance with one non-limiting embodiment.

FIG. 7 depicts an example message sequence chart in accordance with one non-limiting embodiment. The physical transfer of funds is schematically shown using solid lines and electronic communication messaging is shown using dotted lines. A player 701 first tenders funds to a gaming device 722, either directly or through an intermediary, such as a dealer, cashier, pit boss, etc. As described above, the gaming device 722 can be any suitable device or system that is configured to transmit wagering information to a networked device. The gaming device 722 then provides a wager report to a gaming computing system 710. This wager report can be provided at any suitable time, such as in real-time, substantially real-time, in batch, or upon request, for example. The gaming computing system 710 transmits a wager report to a funds management server 720. The wager report provided by the gaming computing system 710 can be, for example, a report aggregating a plurality of wager reports received from one or more gaming devices. This wager report can be provided by the gaming computing system 710 at any suitable time, such as in real-time, substantially real-time, in batch, or upon request, for example. The funds management server 720 can then transmit a wager report to a financial institution 702. The wager report provided by the funds management server 720 can be, for example, a report aggregating a plurality of wager reports received from the gaming computing system 710. The financial institution can then post a provisional credit to a financial account 704. The value of the provisional credit can be equal to the amount of net new funds received at the gaming device 722, or less than the full amount.

Referring again the gaming device 722, the funds are eventually removed and transferred to a count room 730. Subsequent to processing, armored transport 760 can be utilized to deliver the funds to the financial institution 702.

Based upon the value of the deposited physical funds, the financial institution can convert some or all of the provisional credit to a full credit.

Figure 8:
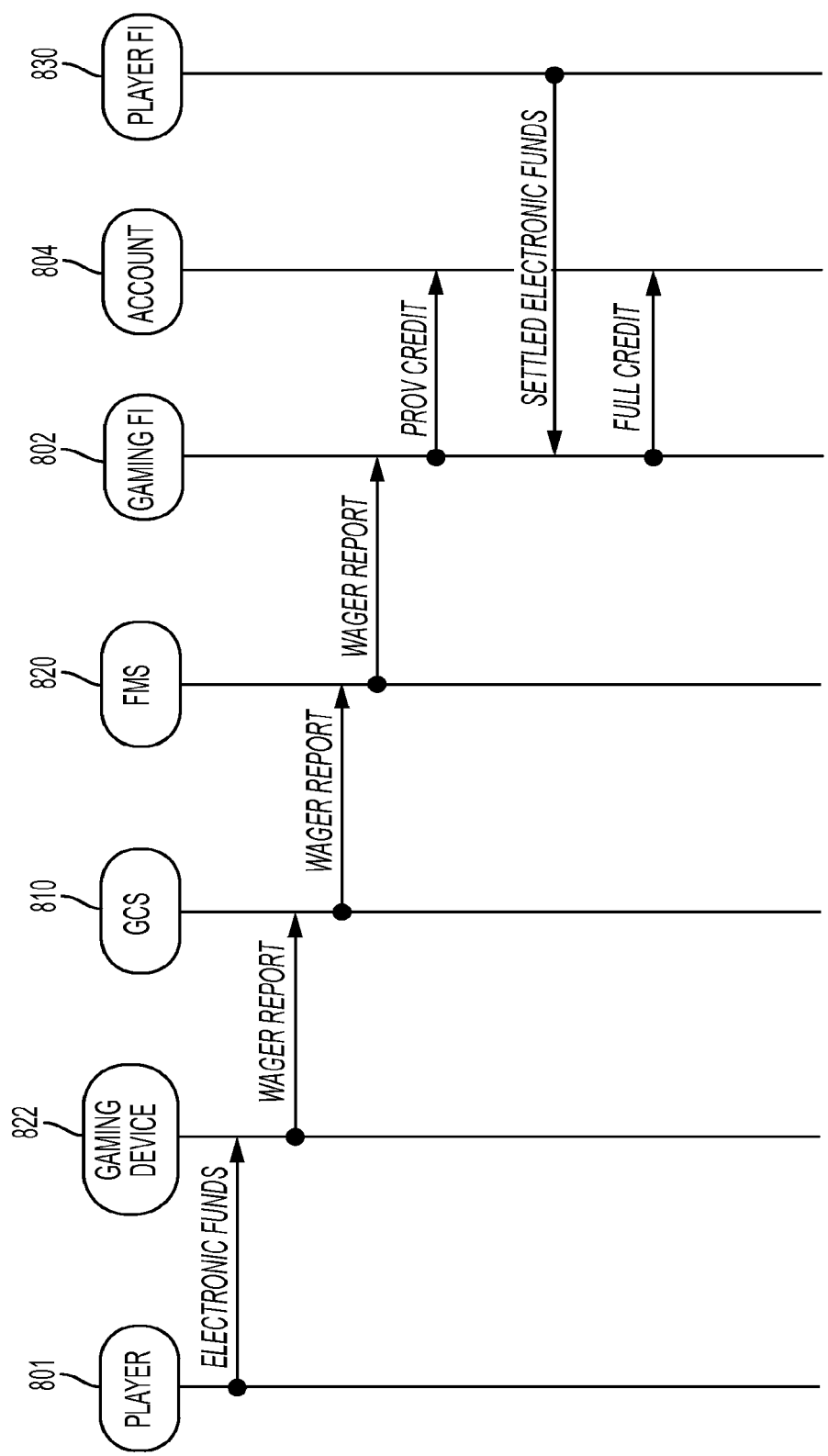
FIG. 8 depicts an example message sequence chart in accordance with another non-limiting embodiment.

FIG. 8 depicts another example message sequence chart in accordance with one non-limiting embodiment. A player 801 first tenders electronic funds to a gaming device 822, either directly or through an intermediary, such as a dealer or cashier, or via an online portal or application. The gaming device 822 then provides a wager report to a gaming computing system 810. This wager report can be provided at any suitable time, such as in real-time, substantially real-time, in batch, or upon request, for example. The gaming computing system 810 transmits a wager report to a funds management server 820. The wager report provided by the gaming computing system 810 can be, for example, a report aggregating a plurality of wager reports received from one or more gaming devices. This wager report can be provided by the gaming computing system 810 at any suitable time, such as in real-time, substantially real-time, in batch, or upon request, for example. The funds management server 820 can then transmit a wager report to a financial institution 802. The wager report provided by the funds management server 820 can be, for example, a report aggregating a plurality of wager reports received from the gaming computing system 810. The financial institution can then post a provisional credit to a financial account 804. The value of the provisional credit can be equal to the amount of net new funds received at the gaming device 822, or less than the full amount. Settled funds are eventually received from a player financial institution 830, sometimes more than 1-3 days after the original wager was placed. Based upon the value of the settled funds, the financial institution can convert some or all of the provisional credit to a full credit.

Figure 9:
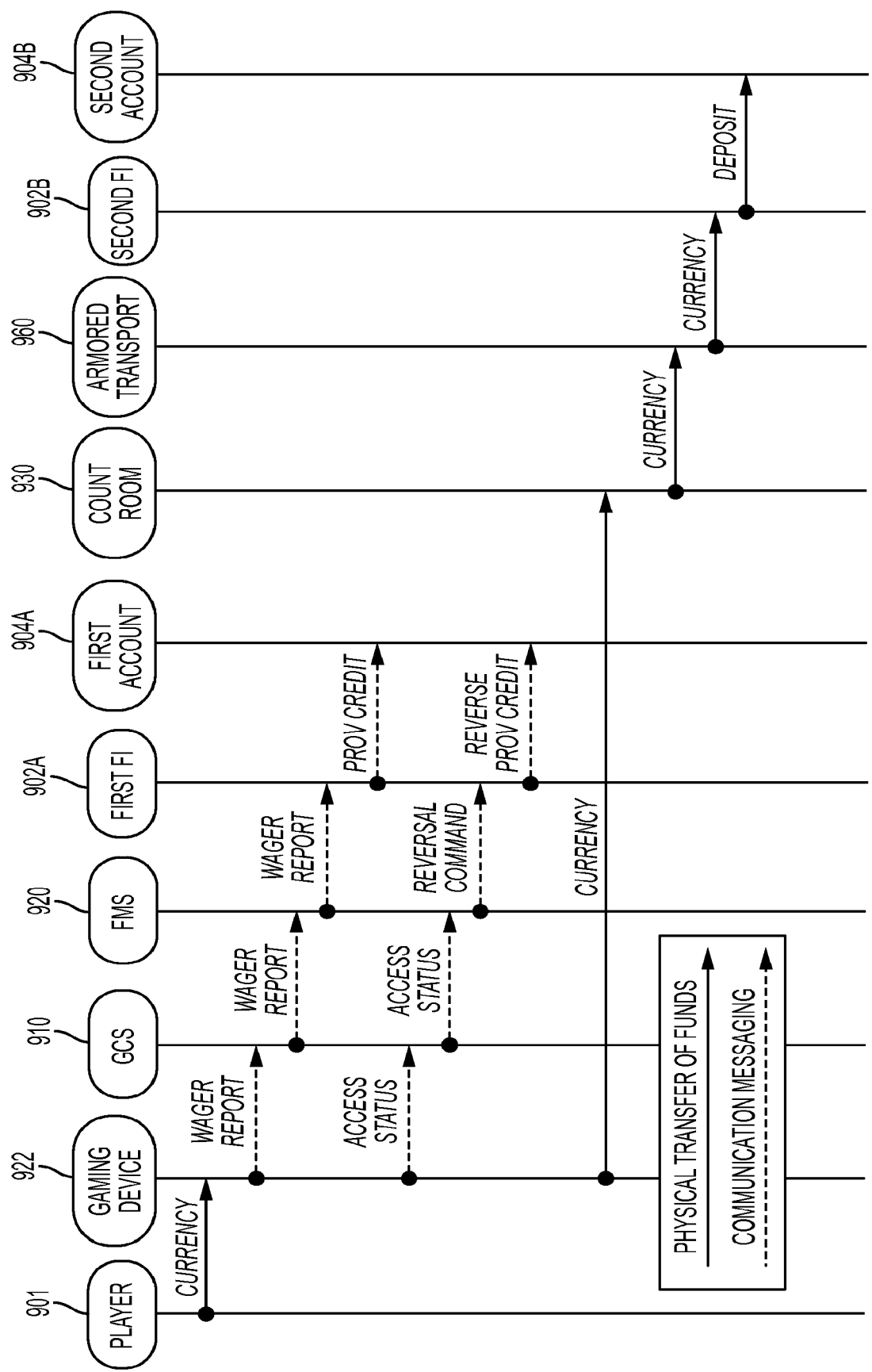
FIG. 9 depicts an example message sequence chart in accordance with another non-limiting embodiment.

FIG. 9 depicts an example message sequence chart in accordance with one non-limiting embodiment in which multiple financial institutions are utilized. As with FIG. 7, the physical transfer of funds is schematically shown using solid lines and electronic communication messaging is shown using dotted lines. A player 901 first tenders funds to a gaming device 922, either directly or through an intermediary, such as a dealer, cashier, pit boss, etc. As described above, the gaming device 922 can be any suitable device or system that is configured to transmit wagering information to a networked device. The gaming device 922 then provides a wager report to a gaming computing system 910. This wager report can be provided at any suitable time, such as in real-time, substantially real-time, in batch, or upon request, for example. The gaming computing system 910 transmits a wager report to a funds management server 920. The wager report provided by the gaming computing system 910 can be, for example, a report aggregating a plurality of wager reports received from one or more gaming devices. This wager report can be provided by the gaming computing system 910 at any suitable time, such as in real-time, substantially real-time, in batch, or upon request, for example. The funds management server 920 can then transmit a wager report to a first financial institution 902A. The wager report provided by the funds management server 920 can be, for example, a report aggregating a plurality of wager reports received from the gaming computing system 910. The first financial institution 902A can then post a provisional credit to a first financial account 904A. The value of the provisional credit can be equal to the amount of net new funds received at the gaming device 922, or less than the full amount.

Benefits can be gained based on the a provisional credits posted to the first financial account 904A until the currency held by the gaming device 922 is, or could have been, physically accessed. Eventually, a point of access of the gaming device 922 is opened and an access status indicator is provided to the gaming computing system 910 by the gaming device 922. The gaming computing system 910 transmits the access status to the funds management server 920. The funds management server 920 can determine the amount of provisional credits to be reversed based on the access event (or collection of access events) and a reversal command is transmitted to the first financial institution 902A via suitable communications. The first financial institution 902A then reverses the amount of provisional credits identified in the reversal command. Referring again the gaming device 922, the funds are eventually removed and transferred to a count room 930. Subsequent to processing, armored transport 960 can be utilized to deliver the funds to the second financial institution 902B. Based upon the value of the deposited physical funds, the second financial institution 902B can credit the second financial account 904B.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:

1. A wager crediting system, comprising:
a funds management server in networked communication with a gaming environment and a financial institution computing system, wherein the gaming environment comprises a plurality of gaming devices that each accepts player funds for wagering, and wherein the funds management server comprises at least one processor and non-transitory computer readable medium having instructions stored thereon which when executed by a processor cause the processor to:
receive a wager report, wherein the wager report indicates an amount of net new player funds received at a gaming device, wherein the gaming device is one of the plurality of gaming devices;
based on the amount of net new player funds indicated on the wager report, communicate with the financial institution computing system to cause the issuance of a provisional credit to a financial account maintained at a financial institution associated with the gaming environment;
subsequent to the issuance of the provisional credit to the financial account, receive from an indication of an access event at the gaming device;
based on receiving the indication of the access event, cause a reversal of the provisional credit issued to the financial account by the funds management serve based on receiving the indication of the access event; and
communicate with the financial institution computing system to cause at least part of the provisional credit to be reversed.

2. The wager crediting system of claim 1, wherein the amount of net new player funds comprises an amount of currency, an amount of electronic funds, or a combination of the amount of currency and the amount of electronic funds.

3. The wager crediting system of claim 1, wherein the amount of net new player funds comprises an amount of electronic funds.

4. The wager crediting system of claim 1, wherein the amount of net new player funds comprises an amount of currency.

5. The wager crediting system of claim 1, wherein the gaming device is any of a slot machine, a video poker machine, a casino cage machine, and a table game.

6. The wager crediting system of claim 1, wherein the gaming environment comprises comprise a slot management system and the funds management server in networked communication with the a slot management system.

7. A computer-based method of crediting player funds received by a gaming device, the method performed by a funds management server comprising instructions stored in a memory, which when executed by one or more processors of the funds management server, cause the funds management server to perform the method comprising:
receiving an indication of a first amount of net new player funds received at a first gaming device of a gaming environment, wherein the first amount of net new player funds comprises any of an amount of currency received at the first gaming device and an amount of electronic funds received at the first gaming device;

based on the first amount of net new player funds, causing the issuance of a first provisional credit to a financial account maintained at a financial institution associated with the gaming environment;

receiving an indication of a second amount of net new player funds received at a second gaming device of the gaming environment, wherein the second amount of net new player funds comprises any of an amount of currency received at the second gaming device and an amount of electronic funds received at the second gaming device;

based on the second amount of net new player funds, causing the issuance of a second provisional credit to the financial account maintained at the financial institution associated with the gaming environment; and based on receiving an indication of an access event at the first gaming device, causing at least a portion of the first provisional credit to the be reversed, and wherein the first provisional credit for is recognized as a full credit only upon the receipt of settled funds by the financial institution or the receipt of physical funds by the financial institution.

8. The computer-based method of claim 7, further comprising:

based on receiving an indication of an access event at the second gaming device, causing at least a portion of the second provisional credit to the be reversed, and wherein the second provisional credit for is recognized as a full credit only upon the receipt of settled funds by the financial institution or the receipt of physical funds by the financial institution.

9. The computer-based method of claim 8, wherein each of the first and second gamine devices are any of a slot machine, a video poker machine, a casino cage machine, and a table game.

10. The computer-based method of claim 7, wherein at least one of the first and second gaming devices is a mobile computing device.

11. A computer-based method of crediting player funds received by a gaming device, the method performed by a funds management server in communication with a gaming environment and a financial institution computing system, the funds management server comprising instructions stored in a memory, which when executed by one or more processors of the funds management server, cause the funds management server to perform the method comprising:

receiving by the funds management server from the gaming environment, an indication of an amount of net new player funds received at each of a plurality of gaming devices;

causing the issuance by the financial institution computing system of a provisional credit to a financial account maintained at a financial institution based on the amount of net new player funds;

subsequent to the issuance of the provisional credit to the financial account, receiving from the gaming environment an indication of an access event at one of the plurality of gaming devices; and based on receiving the indication of the access event, causing a reversal of at least a portion of the provisional credit issued to the financial account by the funds management server.

12. The computer-based method of claim 11, wherein each of the plurality of gaming devices is any of a slot machine, a video poker machine, a casino cage machine, and a table game.

13. The computer-based method of claim 11, wherein each of the plurality of gaming devices is any of a desktop computer, a laptop computer, a tablet computer, a smart phone, and a mobile computing device.

14. The computer-based method of claim 11, wherein the indication of the amount of net new player funds is received by the funds management server in substantially real-time subsequent to each of the plurality of gaming devices receiving the player funds.

15. The computer-based method of claim 11, wherein the indication of the amount of net new player funds received is received by the funds management server comprises an amount of net new funds received at each of the plurality of gaming devices over a period of time.

16. The computer-based method of claim 11, wherein the amount of net new player funds comprises any of:

an amount of currency received at the gaming device; and an amount of electronic funds received at the gaming device.

17. The computer-based method of claim 11, wherein causing the reversal of the at least a portion of provisional credit issued by the financial account by the funds management server comprises transmitting to the financial institution computing system an amount of provisional credit to be reversed.

18. The computer-based method of claim 11, wherein the indication of an amount of net new player funds is provided to the funds management server in a wager report.

19. The computer-based method of claim 11, wherein at least one of the plurality of gaming devices is a mobile computing device physically located within a gaming environment when the net new player funds are received.

20. The computer-based method of claim 11, wherein at least one of the plurality of gaming devices is a mobile computing device that is physically outside a gaming environment.

* * * * *

UNITED STATES PATENT AND TRADEMARK OFFICE
CERTIFICATE OF CORRECTION

PATENT NO. : 12,205,438 B2  
APPLICATION NO. : 18/229828  
DATED : January 21, 2025  
INVENTOR(S) : Kirk E. Sanford et al.

Page 1 of 1

It is certified that error appears in the above-identified patent and that said Letters Patent is hereby corrected as shown below:

In the Claims

Column 22, Claim 1, Line 32, change "receive from an indication" to --receive an indication--;
Column 22, Claim 1, Line 36, change "serve" to --server--;
Column 22, Claim 6, Line 56, change "comprises comprise a slot" to --comprises a slot--;
Column 22, Claim 6, Line 58, change "the a slot" to --the slot--;
Column 23, Claim 7, Line 21, change "credit to the be reversed" to --credit to be reversed--;
Column 23, Claim 7, Line 22, change "credit for is recognized" to --credit is recognized--;
Column 23, Claim 8, Line 30, change "credit to the be reversed" to --credit to be reversed--;
Column 23, Claim 8, Line 31, change "credit for is recognized" to --credit is recognized--; and
Column 23, Claim 9, Line 36, change "gamine" to --gaming--.

Signed and Sealed this  
Twenty-fifth Day of February, 2025

Coke Morgan Stewart  
*Acting Director of the United States Patent and Trademark Office*